United States Patent [19]

Jedlitschka et al.

[11] 3,882,975

[45] May 13, 1975

[54] BRAKE AND MOUNTING STRUCTURE FOR NONDRIVEN VEHICLE WHEEL

[75] Inventors: Rudolf Jedlitschka; Manfred Goeft, both of Friedrichshafen, Germany

[73] Assignee: Zahnradfabrik Friedrichshafen Aktiengesellschaft, Friedrichshafen, Germany

[22] Filed: Mar. 26, 1973

[21] Appl. No.: 345,175

[52] U.S. Cl. .................. 188/271; 188/290; 192/4 B

[51] Int. Cl. .................. F16d 63/00

[58] Field of Search .................. 188/271, 290, 296; 192/4 B; 60/330; 73/134

[56] References Cited

UNITED STATES PATENTS 3,185,261 5/1965 Campbell et al. .................. 188/296

FOREIGN PATENTS OR APPLICATIONS 659,627 3/1963 Canada .................. 188/271

*Primary Examiner*—George E. A. Halvosa
*Attorney, Agent, or Firm*—Karl F. Ross; Herbert Dubno

[57] ABSTRACT

A nondriven vehicle wheel, e.g. that of a trailer, has its hub connected to its fixed axle through a driver-operated retarder. The rotatable member of the retarder is coupled to the hub via a planetary-gear train in its interior.

4 Claims, 1 Drawing Figure

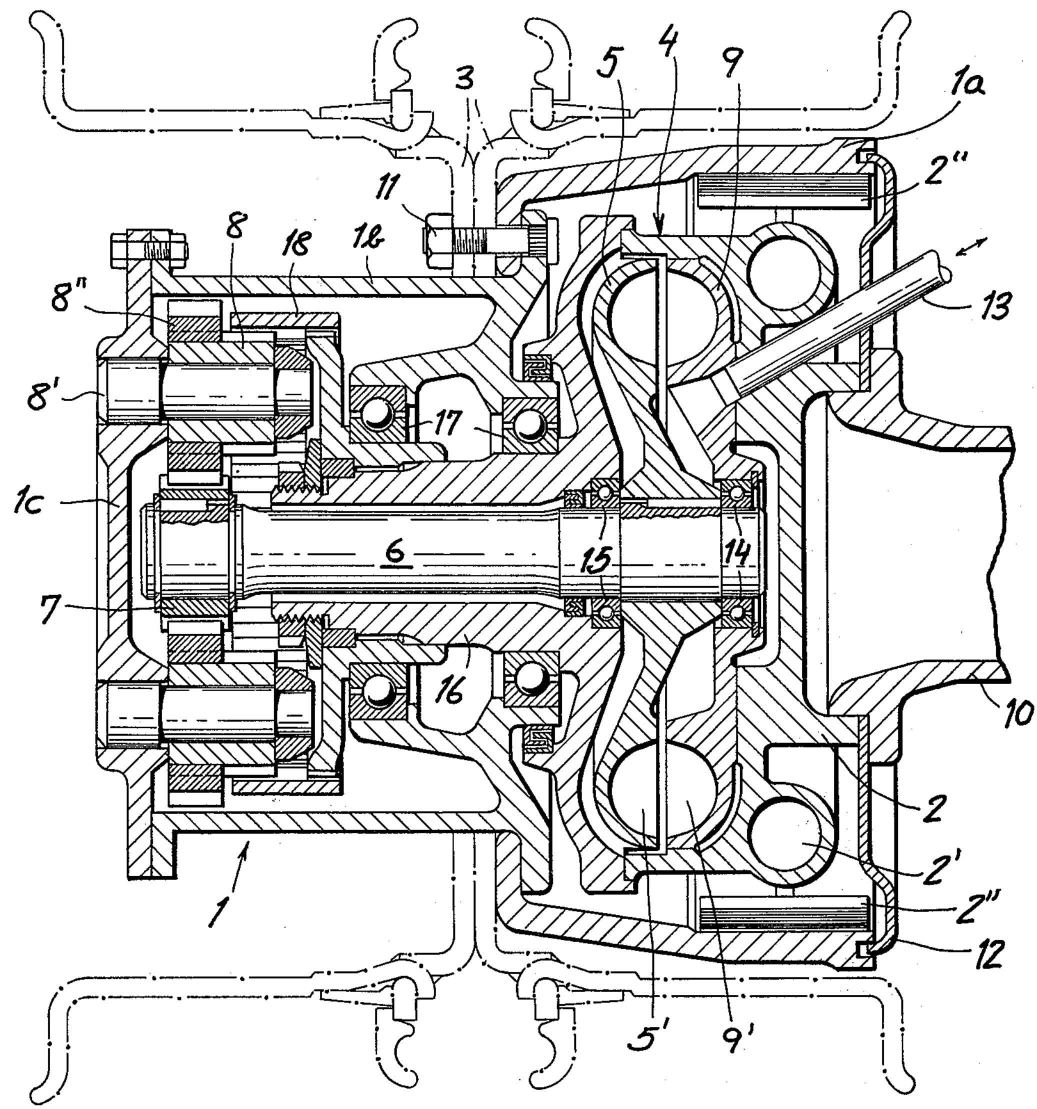
3
5
4
9
1a
2''
11
8
18
1b
13
8''
8'
17
1c
6
15
14
7
16
10
2
2'
1
2''
12
5'
9'

BRAKE AND MOUNTING STRUCTURE FOR NONDRIVEN VEHICLE WHEEL

FIELD OF THE INVENTION

Our present invention relates to a vehicular wheel mounting, particularly for a nondriven wheel such as, for example, that of a trailer.

BACKGROUND OF THE INVENTION

It is frequently desirable, especially in the case of heavy-duty vehicles, to provide driver-operated retarders for such nondriven wheels, e.g. in order to brake them on downhill travel. Such retarders may supplement standard mechanical brakes used for sudden stops and for locking the wheel on standstill.

OBJECT OF THE INVENTION

The object of our present invention is to provide a compact wheel mounting of the type described, incorporating such a retarder.

SUMMARY OF THE INVENTION

This object is realized, in accordance with our present invention, by disposing a retarder inside the hollow vehicle hub as part of a coupling between this hub and the stationary wheel axle. As long as the retarder is not actuated, the hub turns freely; upon such actuation, this rotation is slowed by the resulting braking effect.

Advantageously, pursuant to a further feature of our invention, the coupling between the hub and the axle includes a step-up transmission such as a planetary-gear train in tandem with the retarder; this is desirable since it makes the retarder more effective at low traveling speeds.

BRIEF DESCRIPTION OF THE DRAWING

The above and other features of our invention will now be described in detail with reference to the accompanying drawing, the sole FIGURE of which is an axial sectional view of our improved wheel mounting.

SPECIFIC DESCRIPTION

The wheel mounting shown in the drawing comprises a hollow hub 1 formed by a brake drum 1*a*, a cylindrical extension 1*b* of that brake drum serving as a gear housing and an end plate 1*c* detachably mounted on housing 1*b*. Drum 1*a*, cantilevered on gear housing 1*b* as a substantially cylindrical extension thereof, coacts with a stationary brake carrier 2, including an oil chamber 2' and brakeshoes 2'', which is fixedly secured to a stationary axle 10 on the chassis of a nonillustrated vehicle (e.g. trailer). Screws 11 (only one shown) serve to attach the hub 1 to twin wheel rims 3 designed to carry a pair of nonillustrated rubber tires. The interior of hub 1 is closed toward the rear by a cover plate 12 also fixedly mounted on axle 10.

A hydraulic retarder 4 comprises a stationary member 9, secured to brake carrier 2, and a rotatable member 5 coaxial therewith, the two members being provided with respective vanes 9', 5' which impede their relative rotation upon admission of hydraulic liquid into the retarder through a conduit 13 via a nonillustrated supply system controlled by the operator of the vehicle. Rotary member 5 is keyed to a shaft 6 journaled by bearings 14, 15 on member 9 and in a sleeve 16 forming a fixed extension of brake carrier 2. Hub 1, in turn, is journaled by bearings 17 on the sleeve 16 which carries a nonrotatable ring gear 18. The latter is in mesh with a set of planetary gears 8 whose shafts 8' are supported on the end plate 1*c* and which are in positive engagement with respective pinions 8'' meshing with a sun gear 7 on shaft 6.

As will be readily apparent, rotation of hub 1 with reference to stationary elements 2, 9, 10, 16 and 18 results in a codirectional but faster rotation of unit 5 – 7, this step-up making the decelerating action of retarder 4 more effective.

Upon a shifting of a valve in the supply circuit to drain the retarder via conduit 13, the rotation of hub 1 relative to axle 10 is virtually unimpeded.

Although we have specifically illustrated a retarder of hydraulic type, it should be understood that the same could also be operated by other means, e. g. electromagnetically. Furthermore the planetary-gear train 7, 8, 18 may be replaced by different gear couplings.

We claim:

1. A vehicular wheel mounting comprising:

an axle fixedly secured to the body of a vehicle;

supporting means secured to an extremity of said axle;

a retarder including a stationary member carried on said supporting means, a shaft in line with said axle rotatably mounted on said supporting means, and a movable member mounted on said shaft adjacent said stationary member;

a sleeve forming a fixed extension of said supporting means beyond said retarder, said shaft being journaled in said sleeve and projecting therefrom with a free end;

a hollow hub rigid with a wheel rim rotatably journaled on said sleeve, said hub forming a gear housing around said free end and a substantially cylindrical extension of said gear housing immediately surrounding said retarder; and a planetary-gear train in said gear housing said gear train including a planet carrier integral with said hub, a sun gear on said free end and a ring gear fixedly secured to said sleeve.

2. A wheel mounting as defined in claim 1 wherein said supporting means is a brake carrier, said extension forming a brake drum around said brake carrier on the side of said retarder remote from said planetary-gear train, further comprising brake means on said brake carrier within said brake drum.

3. A wheel mounting as defined in claim 2 wherein said brake drum is cantilevered on said gear housing.

4. A wheel mounting as defined in claim 1 wherein said retarder is hydraulically operable.

* * * * *